UNITED STATES PATENT OFFICE.

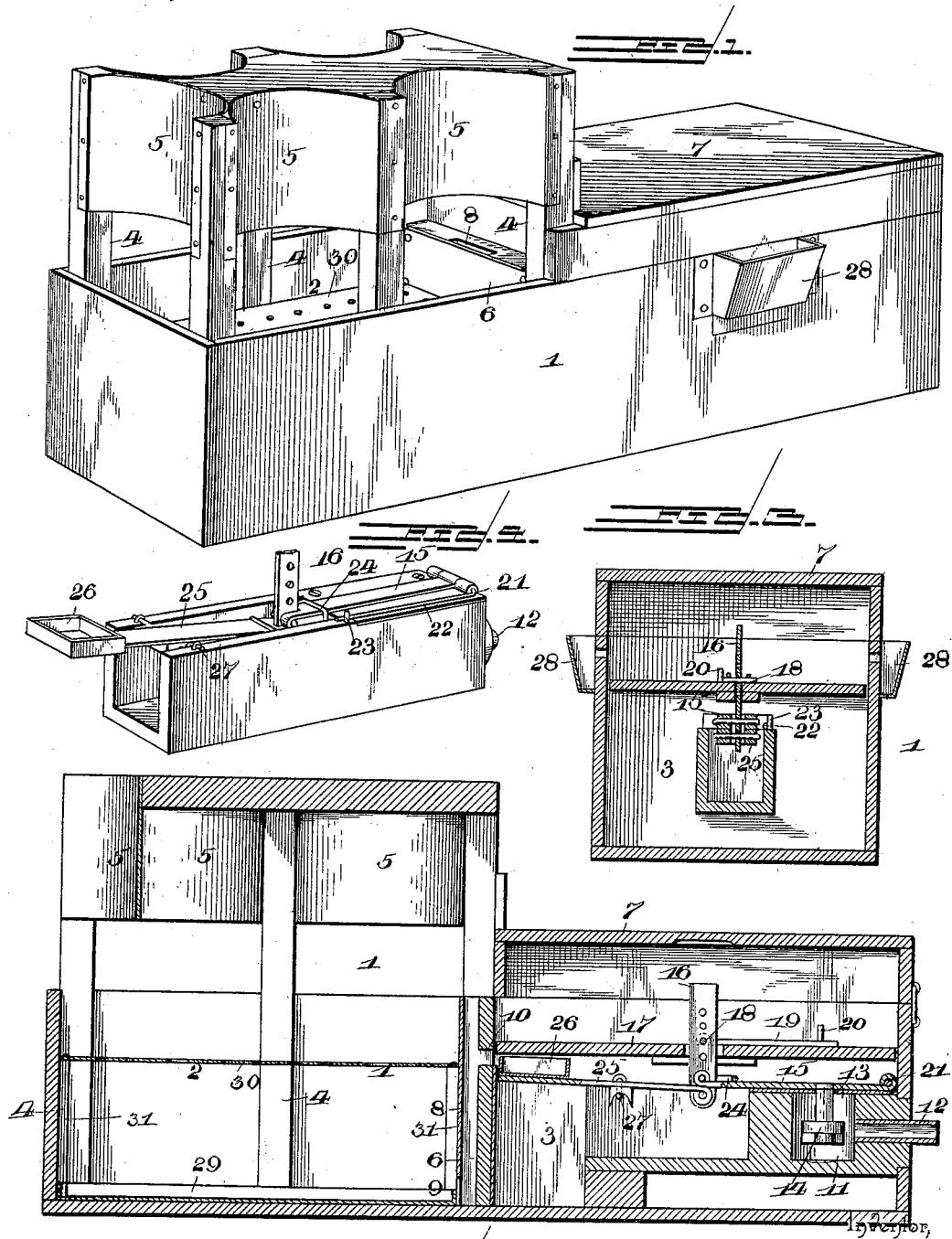

BEERI WARD TUTTLE, OF SHULLSBURG, WISCONSIN; JEROME L. TUTTLE ADMINISTRATOR OF SAID BEERI WARD TUTTLE, DECEASED.

STOCK-WATERER.

SPECIFICATION forming part of Letters Patent No. 607,301, dated July 12, 1898.

Application filed September 25, 1895. Serial No. 563,627. (No model.)

*To all whom it may concern:*

Be it known that I, BEERI WARD TUTTLE, a citizen of the United States, residing at Shullsburg, in the county of Lafayette and State of Wisconsin, have invented a new and useful Stock-Waterer, of which the following is a specification.

The invention relates to improvements in stock-waterers.

The object of the present invention is to improve the construction of stock-waterers and to provide a simple and efficient one in which the supply of water will be automatically controlled and which will afford stock ready access to the water and at the same time prevent them from getting their feet into the same and spoiling the water.

The invention consists in the construction and novel combination and arrangement of parts, hereinafter fully described, illustrated in the accompanying drawings, and pointed out in the claims hereto appended.

In the drawings, Figure 1 is a perspective view of a stock-waterer constructed in accordance with this invention. Fig. 2 is a central longitudinal sectional view of the same. Fig. 3 is a transverse sectional view. Fig. 4 is a detail perspective view of the valve-operating mechanism.

Like numerals of reference indicate corresponding parts in all the figures of the drawings.

1 designates a trough provided at its front with a drinking-compartment 2 and having in rear of the same a float-compartment 3, into which the water is introduced before reaching the drinking-compartment. The drinking-compartment is provided at its edges with a partition or fencing inwardly offset from the vertical plane of the sides of the drinking-compartment and forming a series of drinking-openings and consisting of posts 4 and curved semicylindrical portions or plates 5, arranged between the posts and forming the openings and adapted to admit the head of an animal. The inwardly-offset portions which are located a sufficient distance above the upper edges of the compartment to form an intervening space between them and the compartment may be constructed of any suitable material, such as sheet metal, and they extend inward over the water and are of sufficient size to permit animals to drink freely, but prevent them from getting their feet into the water while drinking. These offsets or inward bends, which may be of any desired shape and size, are located a sufficient distance apart to prevent an animal while drinking at one opening from getting its feet into another and spoiling the water.

The float-compartment is separated from the drinking-compartment by a transverse partition 6 and is provided with a removable cover 7. The transverse partition 6 is provided with a vertical water-passage 8, and has upper and lower openings 9 and 10 communicating, respectively, with the drinking-compartment and the float-compartment and adapted to prevent any mud or sediment of the drinking-compartment from reaching the valve mechanism.

By arranging openings at the top and bottom of the passage 8 surface water is taken from the float-compartment and delivered to the drinking-compartment at the bottom thereof. This prevents the sediment which collects at the bottom of the float-compartment from being disturbed, and it also gives any sediment which may still remain in the water a chance to settle at the bottom of the drinking-compartment.

Within the float-compartment is mounted a valve chamber or casing 11, communicating with a supply-pipe 12, and provided at its top with a valve-opening 13, from which water is discharged into the float-chamber. When the water in the float-compartment has reached the desired elevation, the valve-opening 13 is closed to shut off the water by a valve-plug 14, connected by a stem with a lever 15, and the latter is fulcrumed at its rear end on the valve chamber or casing, being connected with the stem at a point intermediate its ends. The front end of the lever 15 is adjustably connected by a link 16 with a rectangular float 17, provided with a slot to receive the link and having a pintle or pin 18, which passes through suitable eyes of the float and is adapted to engage any one of a series of perforations of the link. By this construction the float can be adjusted to operate to shut off the water when the latter has reached the desired elevation. The pin 18 is detachably locked in operative position by means of an integral arm 19, engaging a stop or lug 20 of the float. The pivot or fulcrum 21 of the lever 15 is provided with an arm 22, engaging a stop or lug 23 of the valve chamber or casing, and the pivot which connects the butt-end of the lever to the link is secured in position by an L-shaped arm or extension 24, having its terminal bent downward and engaging the lever.

The operation of the float is assisted by a counterbalancing-lever 25, having its rear or inner end connected with the link and provided at its front or outer end with a box or receptacle 26, adapted to receive a suitable weight. The lever 25 is provided intermediate of its ends with depending lugs and is fulcrumed between the same on an oscillating pivot 27, having a crank-bend and arranged in a recess of the valve chamber or casing. The swinging pivot or fulcrum permits the link to remain in a vertical position, and the inner face of the cover is provided with a recess to enable the link to move upward to the desired extent. The rectangular float fits snugly within the float-compartment and is located above and conceals the levers 15 and 25.

The trough is provided at opposite sides of the float-compartment with metal cups 28, secured to the exterior faces of the sides of the trough and communicating with the interior thereof by openings which permit water to flow into the cups. The cups, which may be of any desired construction, are open at the top and are provided for the purpose of enabling chickens and other fowls to obtain water without interference on the part of the stock.

Within the drinking-compartment is arranged a removable receptacle 29, constructed of any suitable material, either wood or metal, and adapted to collect the mud and other sediment of the water and to enable such accumulation to be conveniently removed. The receptacle is preferably composed of a bottom portion and sides, which may be of any desired type, and located above the receptacle a short distance below the surface of the water is a perforated or foraminous platform 30, adapted to permit water and sediment to flow freely through it and capable of forming a support to prevent small animals from drowning in the event of their getting into the drinking-compartment and to assist them in getting out of same. This platform may be constructed of any suitable material and may be supported by posts 31 or in any other suitable manner, and it forms a false bottom for the drinking-compartment to provide a shallow drinking-trough to prevent animals from agitating the entire body of water in the drinking-compartment and stirring any sediment collecting in the receptacle 29. The receptacle 29 and the platform or support 31 may be handled together in removing them from the drinking-compartment, or they may be removed independently of each other, and any suitable means may be provided for facilitating their removal and replacement.

It will be seen that the stock-waterer is simple and comparatively inexpensive in construction, that it is automatic in its operation and capable of affording a continuous supply to the stock, and that it will prevent the animals from getting into the water and soiling it.

Changes in the form, proportion, and the minor details of construction may be resorted to without departing from the principle or sacrificing any of the advantages of this invention.

What I claim is—

1. In a stock-waterer, the combination of a drinking-compartment, a series of vertical posts arranged at intervals and projecting above the upper edges of the compartment, and a vertical partition mounted on the posts and located above the upper edges of the compartment with an intervening space between its lower edge and the said upper edges, said partition being inwardly offset from the plane of the sides of the compartment to provide separate drinking-openings, whereby animals in drinking will be separated and their heads will be prevented from being caught in the drinking-openings, substantially as described.

2. A stock-waterer comprising a trough, a transverse partition dividing the trough into a drinking-compartment and a float-compartment, and provided with a vertical water-passage and having openings at the top and bottom thereof communicating, respectively, with the float-compartment and the drinking-compartment, whereby surface water will be taken from the float-compartment and delivered to the drinking-compartment at the bottom thereof, and a float-valve arranged in the float-compartment and arranged to control the supply of water to prevent the water in the float from flowing over the top of the transverse partition into the drinking-compartment, substantially as described.

3. A stock-waterer, comprising a trough, a supply-pipe, a valve chamber or casing communicating with the supply-pipe and having a valve-opening, a substantially horizontally-disposed lever 15, fulcrumed at its outer end at the top of the valve-chamber and provided at a point intermediate of its ends with a valve-plug arranged to cover the valve-opening, a counterbalancing-lever disposed in the same horizontal plane as the lever 15, fulcrumed intermediate of its ends and connected at one end with the adjacent end of the lever 15, and provided at its other end with a fixed weight, and a rectangular float fitting snugly within the trough and located above and concealing the levers, said float being adjustably connected with the lever 15, substantially as described.

4. A stock-waterer, comprising a trough, a supply-pipe, a valve chamber or casing communicating with the supply-pipe and having a valve-opening, a substantially horizontally-disposed lever 15, fulcrumed at its outer end at the top of the valve-chamber and provided at a point intermediate of its ends with a valve-plug arranged to cover the valve-opening, a counterbalancing-lever disposed substantially horizontally, fulcrumed intermediate of its ends and connected at one end with the adjacent end of the lever 15 and provided at its other end with a fixed weight, a vertical link pivotally connected with the adjacent terminals of said levers and extending upward from them, and a horizontal float located above the valve-casing, provided with an opening receiving the link and adjustably secured to the same, substantially as described.

5. In a stock-waterer, the combination of a drinking-compartment, vertical posts arranged at intervals and extended above the drinking-compartment, and a partition mounted on the posts and located a considerable distance above the upper edges of the drinking-compartment to form an intervening space, said partition being constructed of sheet metal and being curved and inwardly offset from the plane of the sides of the compartment, substantially as described.

In testimony that I claim the foregoing as my own I have hereto affixed my signature in the presence of two witnesses.

BEERI WARD TUTTLE.

Witnesses:
EDGAR J. GUNDRY,
JOHN HENRY.